United States Patent [19]

Solomon

[11] 4,126,790

[45] Nov. 21, 1978

[54] STROBED SMOKE DETECTOR

[76] Inventor: Elias E. Solomon, 20 Christina Ct., Duxbury, Mass. 02332

[21] Appl. No.: 725,036

[22] Filed: Sep. 20, 1976

[51] Int. Cl.$^2$ .......... G01N 21/28

[52] U.S. Cl. .......... 250/564; 356/438

[58] Field of Search .......... 250/564, 574, 205, 214; 340/237 S; 324/33; 356/207

[56] References Cited

U.S. PATENT DOCUMENTS

| | | | |
|---|---|---|---|
| 3,585,621 | 6/1971 | DiCello | 340/237 S |
| 3,846,773 | 11/1974 | Lintelmann et al. | 340/237 S |
| 3,919,702 | 11/1975 | Hayes et al. | 340/237 S |
| 3,973,852 | 8/1976 | Moore et al. | 250/564 X |
| 4,011,458 | 3/1977 | Malinowski | 250/564 |

*Primary Examiner*—David C. Nelms
*Attorney, Agent, or Firm*—Wolf, Greenfield & Sacks

[57] ABSTRACT

A pulsed or strobed smoke detector operable periodically in a pulsed mode. A strobe generator having minimum power consumption limits the time of power consumption by other elements of the detector to a fraction of continuously operating time. A storage circuit is also included to limit transient or start-up consumption of power.

17 Claims, 6 Drawing Figures

STROBED SMOKE DETECTOR

BACKGROUND OF THE INVENTION

This invention relates in general to smoke detection and in particular to the operation and supplying of power to smoke detectors.

Recognition in recent years that deaths and injuries from fires, particularly in residential buildings, are far more frequently due to smoke rather than from actual flames has accelerated the development of smoke detectors of various kinds. Work has also been spurred on by the passage of laws and regulations requiring the use of smoke detectors in residences being newly constructed or renovated.

The most common types of smoke detectors presently in use perform the actual detection of smoke by either optical or ionization devices. The present invention is concerned with both types of detectors in several of its aspects but, as is noted below, may best be understood in connection with optical detectors and will be so described.

The basic principle underlying optical smoke detection is the reflection or scattering of light by smoke particles. Simply stated, the absence or presence of a certain amount of light from a source is continuously monitored by a photosensitive element. Smoke, if it appears, is permitted to pass between the light source and the photosensitive element and its effect on light transmission changes the response of the photosensitive element in one way or another to trigger an alarm. Commonly, it is the reflection of light by smoke particles to the photosensitive element which initiates the change of response.

In recent years, the most notable improvement in optical smoke detectors has been the substitution of light-emitting diodes for incandescent light bulbs as the light source in the detectors. Although the light-emitting diode (LED) is a reliable and durable light source, it has certain disadvantages, not the least of which is that it is an inefficient source of light. Consumption of power, which is especially important in battery-operated systems, is unfortunately high. Also, because the light output is relatively low, ultra-sensitive receiver devices and circuits are needed.

One other area of investigation to improve efficiency of optical smoke detectors has involved the use of pulsating light sources. In such arrangements, the use of a duty cycle which cuts the time of operation of the light without sacrificing smoke detecting capacity has indeed resulted in reduced power consumption, but much room for improvement remains.

SUMMARY OF THE INVENTION

The present invention also relies upon pulsing (or strobing) techniques to reduce power consumption and also to improve the sensitivity and reliability of the smoke detector. Basically, however, even greater advantages are derived by resorting to an indirect pulsing or strobing of the light source. Specifically, the power supply, or even more desirably, the regulator commonly used with the power supply for the light source and the associated circuitry is strobed. A further step of storing voltage between pulses further minimizes consumption of power by the smoke detecting apparatus by avoiding instantaneous start-up demands. These concepts are applicable to any type of smoke detector, including optical smoke detectors and ionization detectors as well as other lesser known detectors.

Accordingly, the major object of the invention is to increase the sensitivity and reliability of smoke detectors while simultaneously reducing power consumption.

BRIEF DESCRIPTION OF THE DRAWING

In the annexed drawing, a number of figures are presented as an aid in understanding the detailed description of the invention which follows. In the drawing.

DESCRIPTION OF PREFERRED EMBODIMENTS

Figure 1:
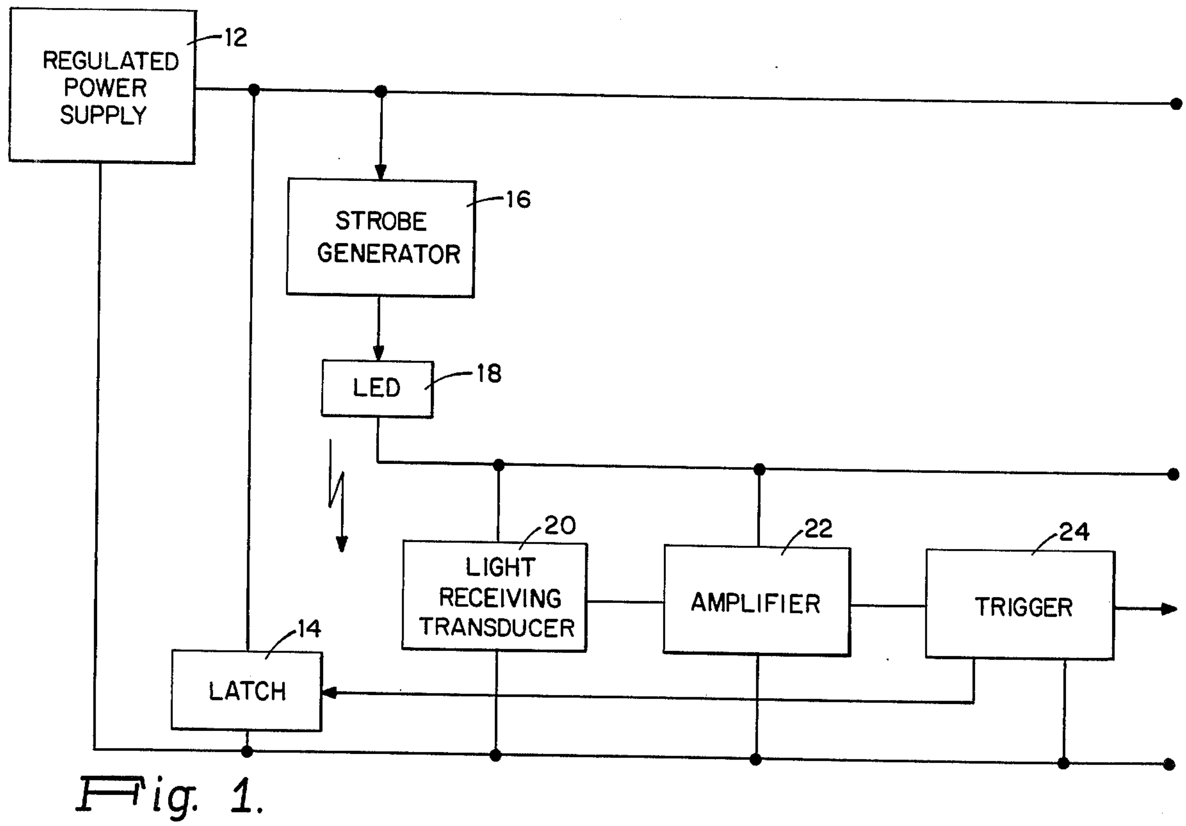
FIG. 1 is a block schematic of a simplified form of the present invention in which the regulated output of a power supply is strobed.

In FIG. 1, there is shown a regulated power supply 12 across which there is directly connected an alarm latch 14 which, when triggered, connects the power supply to the alarm in conventional fashion until the latch is reset. In parallel with the latch are a strobe generator 16 and a light-emitting diode (LED) 18 in series with the parallel combination of a light-receiving transducer 20 and an amplifier 22. The output of the transducer 20 is connected to the amplifier 22 and the output of the latter is connected to a trigger 24. The output of the trigger 24 is connected back to the latch 14.

In most known optical smoke detectors, the supply voltage is typically 12 or 24 volts DC. Because the LED typically has a voltage drop of about 1.5 volts DC, a series ballast resistor is commonly employed and 80% or more of the power consumed is wasted. By placing the LED in series with the associated circuitry as shown here, such waste is avoided, it being necessary only that the regulated voltage from the supply 12 less the turn-on voltage of the LED 18 divided by the circuit impedance be equal to or greater than the turn-on current of the LED 18.

More importantly, however, by providing a strobe generator 16 it is possible to limit the drain upon the output of the regulated power supply to brief intermittent periods. For example, these periods may be of the order of 20 milliseconds every 5 seconds and it is only during these periods that the LED 18, the transducer 20 and the amplifier 22 are operative and consuming power. Such a period is merely exemplary; the only limitations are the response time of the circuit elements, the duty cycle of the strobe generator 16 and an acceptable sampling time to ensure smoke detection.

In the example given, current consumption on a steady state basis might reasonably be of the order of 50 milliamps. With the strobed circuit, the current consumption becomes:

$50 \times 20/5 \times 1000 \text{ ma} = 200\ \mu a$

Figure 2:
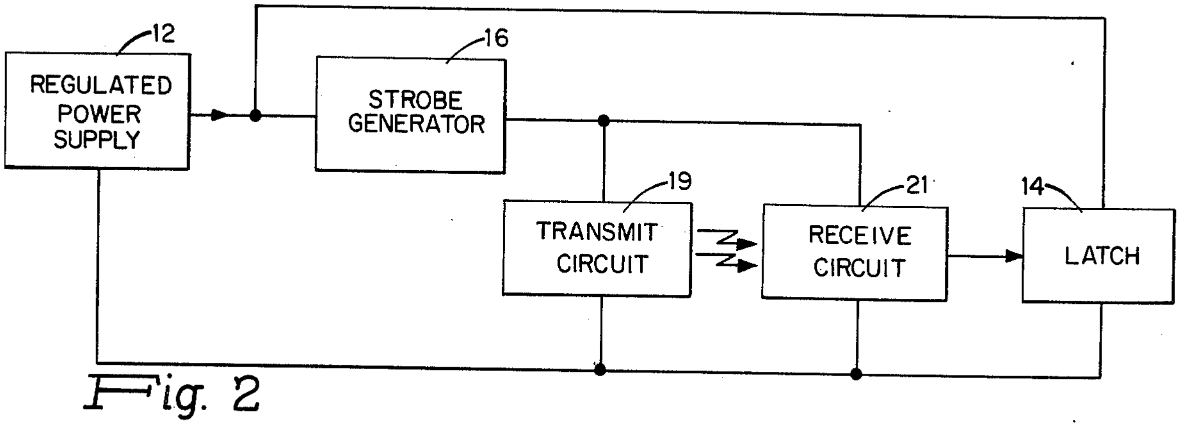
FIG. 2 is a simplified block schematic of a detector circuit similar to that of FIG. 1.

In FIG. 2, a simplified version of the circuit of FIG. 1 is illustrated. Here, the output of the regulated supply 12 is still applied directly to the latch 14, is strobed by the generator 16 and applied in pulsed form to the separated transmit circuit 19 and receive circuit 21. In this instance the LED 18 and the transducer 20 with their associated circuitry are comprehended in the transmit circuit 19 and the amplifier 22, the trigger 24 and their associated circuitry are comprehended in the receive circuit 21.

Figure 3:
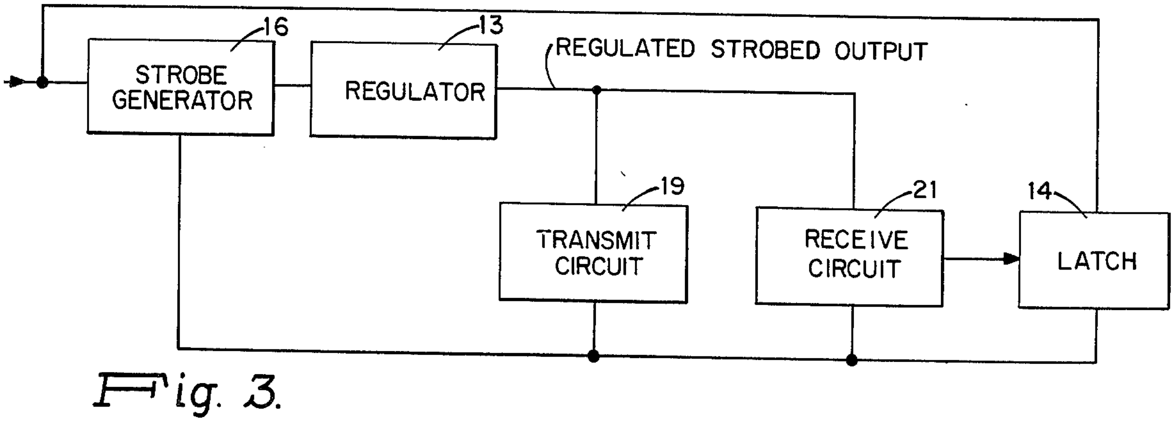
FIG. 3 is a block schematic of a detector circuit in which the unregulated input to a voltage regulator is strobed.

A further improvement in efficiency is obtainable by arranging the circuit elements as shown in FIG. 3. In this instance, unregulated input power is applied directly to the strobe generator 16 and the latch 14. The voltage regulator 13 is then operative only when strobed or gated into operation as are the transmit circuit 19 and the receive circuit 21.

All regulators, of necessity, require a certain amount of current to maintain a regulated output voltage. In a commonly used regulator, input voltage, unregulated, is applied across a series combination of a resistor and a Zener diode. Regulated voltage is then tapped across the diode from its junction with the resistor. There is thus a continuous Zener current drain, but if, as in the circuit of FIG. 2, a current of about 12 milliamps is periodically demanded by the circuits being strobed, a Zener current of even higher value must normally flow to achieve regulation. In the circuit of FIG. 3, however, the regulator 13 draws current only for a short period of the order of milliseconds every few seconds. Parenthetically, and as will be detailed hereinafter, the strobe generator itself requires very little current.

Figure 4:
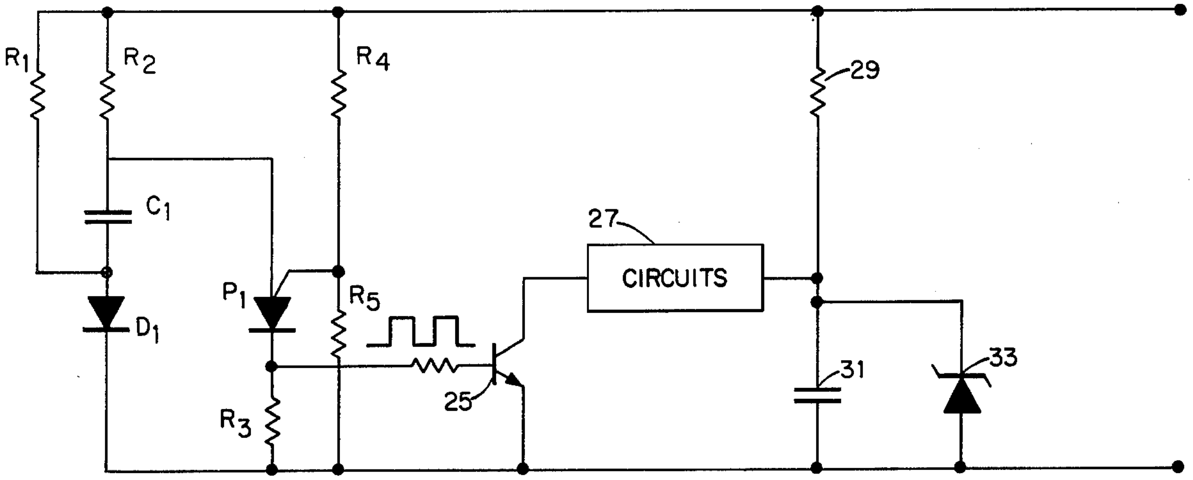
FIG. 4 is a detailed diagram of the components making up the strobe generator, the gated regulator and storage circuit of the invention.

FIG. 4 illustrates in some detail a suitable low current pulse or strobe generator 16 for supplying pulses to a switching transistor 25.

DC voltage is applied to a relaxation oscillator made up of the resistors $R_1$ and $R_2$, the capacitor $C_1$, and the diode $D_1$. The element $P_1$, which may be a so-called programmable unijunction transistor, or other switching device has an applied reference voltage derived from the voltage divider made up of resistors $R_4$ and $R_5$. Each time the charge on the capacitor $C_1$ reaches a value in excess of the breakdown voltage of the element $P_1$, output pulses are produced across the resistor $R_3$. As in the previously described example, assuming a 10 millisecond pulse being applied every 5 seconds to the transistor 25, current flows through a considerable impedance of the transmit and receive circuits, here lumped and shown at 27 and real values of the other elements such as the resistor 29.

During the periods when the transistor 25 is gated on by the strobe generator 13, a storage capacitor 31 paralleled by a Zener diode 33 discharges through the impedance represented by the circuits 27. This discharge is, however, only partial. Between pulses, when the transistor 25 is gated off, the capacitor 31 charges towards the breakdown voltage of the Zener diode 33. However, the resistor 29 is of a value sufficiently high that current drain is maintained at a low level.

With other values as indicated above, a supply voltage of 12 volts DC and a Zener voltage of 10 volts DC, a capacitor 31 of 100 $\mu$F and a resistor 29 of 30 kilohms will operate satisfactorily with a constant current of 100 microamps.

In such conditions, the capacitor 31 will discharge only to the extent of 10%, for example from 10 volts to 9 volts DC during operation and a recharge of a single volt will restore equilibrium.

Figure 5:
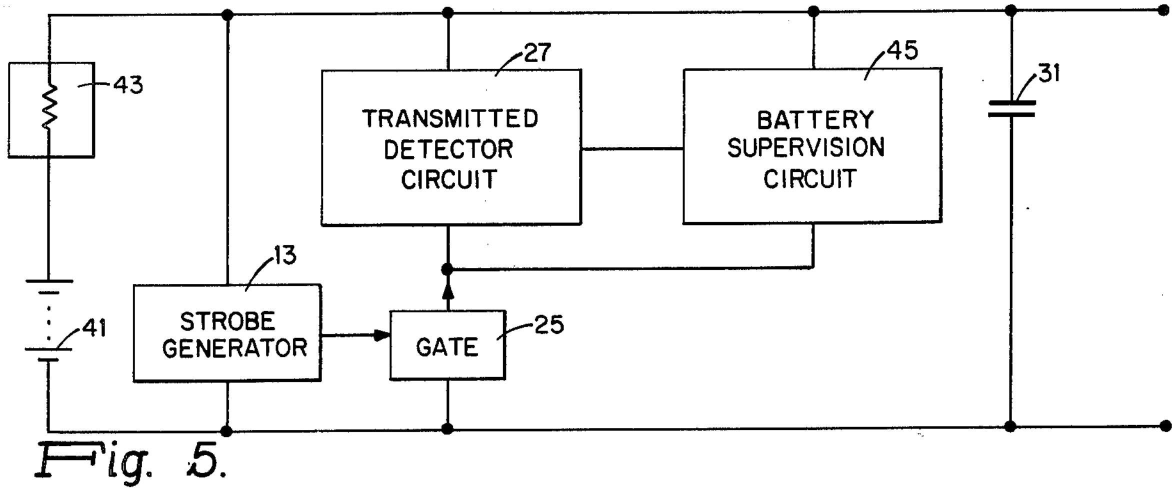
FIG. 5 is a block schematic of a battery-operated and supervised system incorporating the present invention.

The invention as described can indeed be used with ionization smoke detectors and other lesser known systems. Moreover, it is applicable to battery operated systems as well. A typical arrangement for battery operation is shown in FIG. 5.

A battery 41 has an internal resistance 43 which varies as the battery discharges even though voltage remains generally constant. There being no regulator needed, the strobe generator 13 is connected directly across the battery 41. As in previously described embodiments, the generator 13 pulses or strobes a gate 25 to cause periodic operation of the circuits 27. In this instance, though, the reservoir or storage capacitor 31 merely serves to compensate for the increase in battery resistance as the battery discharges.

Figure 6:
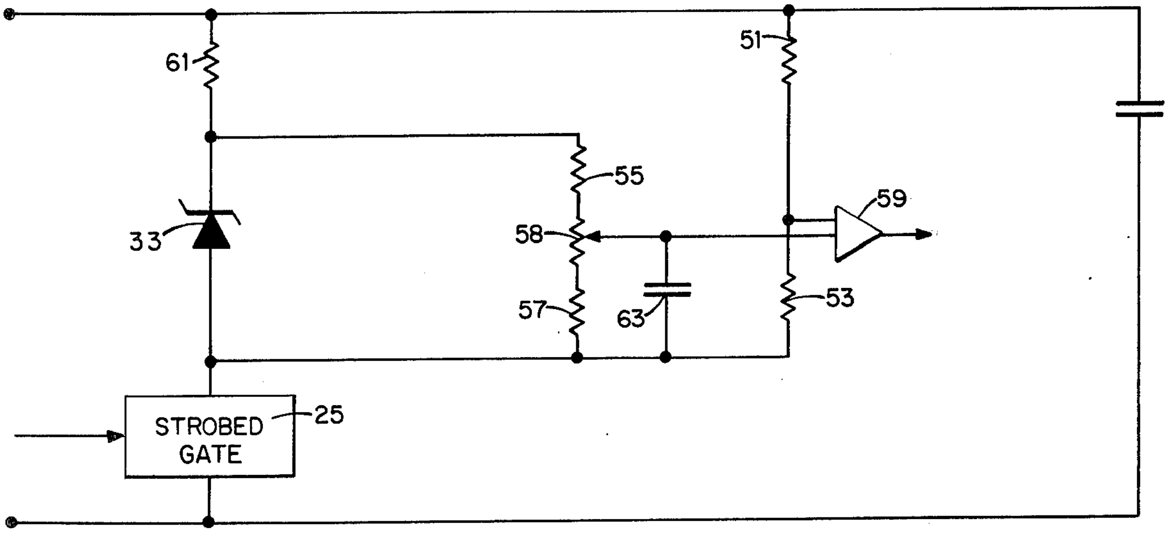
FIG. 6 is a detailed showing of the supervisory circuit of FIG. 5.

Battery supervision may also be included to provide a warning of low battery voltage. To accomplish this, a supervisory circuit 45 is added, and it also is strobed for periodic operation to conserve current. FIG. 6 gives detail on the supervisory circuit which is simply one form of a comparison circuit.

As the gate 25 energizes the circuit, a voltage $V_s$ is developed at the junction of the voltage dividing resistors 51 and 53. An adjustable reference voltage $V_R$ is developed at the tap of the potentiometer 58 which, with resistors 55 and 57 constitutes a second voltage divider across the Zener diode 33, the total voltage being $V_Z$. Circuit values are chosen so that with a fully charged battery $V_s$ is greater than $V_R$ and a high output is derived from a comparator 59, the inputs to which are $V_R$ and $V_s$. With decreasing battery voltage, $V_Z$, the Zener voltage because of its series connection between a resistor 61 and the strobe generator and the nature of Zener operation tends to remain constant, and $V_R$ accordingly also holds constant. On the other hand, $V_s$ drops in value until it ultimately falls below $V_R$ to reverse inputs to the comparator 59 and thereby trigger an alarm. The capacitor 63 is across the resistor 57 and a tapped portion of the potentiometer 58. This is to assure that $V_s$ reaches its stable value before $V_R$ and prevents false actuation of the comparator 59.

What is claimed is:

1. In a smoke detector having means for sensing the presence of smoke, an alarm operatively responsive to changes in the output of said sensing means and a source of power for said sensing means and said alarm, said source of power including a source of unregulated voltage and a voltage regulator, the combination therewith of a strobe generator connected between said source of unregulated voltage and said voltage regulator and supplying pulses to said voltage regulator to cause periodic operation thereof.

2. In a smoke detector as set forth in claim 1 wherein said source of power includes a battery and said sensing means includes a strobed gate in series with said sensing means and further including a capacitor across said battery.

3. In a smoke detector as defined in claim 1, the combination wherein said means for sensing the presence of smoke includes a source of radiant energy and an element sensitive to said radiant energy disposed in operative relationship one to the other, the presence of smoke in the vicinity of said source of radiant energy and said sensitive element being effective to change said operative relationship and cause operation of said alarm.

4. In a smoke detector as defined in claim 1, the combination therewith of a storage circuit connected across said source of power, means for partially discharging said storage circuit through said sensing means during said periodic operation thereof and means for charging said storage circuit during the intervals between said periodic operation of said sensing means.

5. In a smoke detector as defined in claim 3, the combination wherein said source of radiant energy comprises an emitter of light and said sensitive element comprises a photosensitive device, the presence of smoke in the vicinity of said emitter of light causing a change in the quantity of light reaching said photosensitive device from said emitter of light and operation of said alarm.

6. In a smoke detector as defined in claim 1, a supervisory circuit for checking the condition of said source of power, said supervisory circuit being connected to said strobe generator for periodic operation and comprising a comparator circuit including means for developing a substantially constant reference voltage, means for developing a test voltage varying with the condition of said source of power, means for periodically comparing the values of said test voltage and said reference voltage, and an alarm operative in response to said test voltage falling below said reference voltage.

7. In a smoke detector as defined in claim 6, the combination of means for adjusting said reference voltage to predetermine the point at which said alarm is operative.

8. In a smoke detector as defined in claim 6, the combination of a delay circuit connected to said means for developing a substantially constant reference voltage to delay comparison of said test voltage therewith until said test voltage reaches a stable value.

9. In a smoke detector as set forth in claim 3 including means coupling the pulses from the voltage regulator to both the source of radiant energy and the element sensitive to radiant energy.

10. In a smoke detector as set forth in claim 3 including a capacitor storage means connected across said source of power and to at least said element sensitive to radiant energy, said capacitor storage means being discharged through at least said element during periodic operation thereof and being charged during the intervals between said periodic operation.

11. In a smoke detector as set forth in claim 10 wherein said capacitor storage means comprises a capacitor having a zener diode coupled thereacross.

12. In a smoke detector as set forth in claim 11 including a resistor in series with the capacitor, the voltage across said capacitor varying during operation on the order of 10% of the charged voltage of the capacitor.

13. In a smoke detector as set forth in claim 6 wherein said sensing means includes a strobed gate coupled from the output of the strobed regulator and a regulating circuit coupled in series with the strobed gate, said regulating circuit comprising the means for developing a reference voltage.

14. In a smoke detector as set forth in claim 13 wherein said regulating circuit includes a zener diode and resistor both in series with the strobed gate.

15. In a smoke detector having means for sensing the presence of smoke including radiant energy means and radiant energy responsive means, an alarm operatively responsive to changes in the output of said radiant energy responsive means and a source of power for said sensing means and said alarm, the combination therewith of a strobe generator coupled between said source of power and said sensing means, means coupling the pulses from said strobe generator to said radiant energy means and means coupling the pulses from said strobe generator to said radiant energy means and means coupling the pulses from said strobe generator to said radiant energy responsive means, and a capacitor storage means connected across said source of power and to at least said element sensitive to radiant energy, said capacitor storage means being discharged through at least said element during periodic operation thereof and being charged during the intervals between said periodic operation.

16. In a smoke detector as set forth in claim 15 including gate means coupled between said strobe generator means and sensing means.

17. In a smoke detector having means for sensing the presence of smoke including radiant energy means and radiant energy responsive means, an alarm operatively responsive to changes in the output of said radiant energy responsive means and a source of power for said sensing means and said alarm, the combination therewith of a strobe generator coupled between said source of power and said sensing means, means coupling the pulses from said strobe generator to said radiant energy means and said radiant energy responsive means, a supervisory circuit for checking the condition of said source of power, said supervisory circuit being connected to said strobe generator for periodic operation and comprising a comparator circuit including means for developing a substantially constant reference voltage, means for developing a test voltage varying with the condition of said source of power, means for periodically comparing the values of said test voltage and said reference voltage, and an alarm operative in a response to said test voltage falling below said reference voltage, and a strobe gate coupled from the output of said strobe generator, said means for developing a substantially constant reference voltage including a regulating circuit coupled in series with the strobe gate for developing said reference voltage.

* * * * *